US011156156B2

(12) United States Patent
Binek et al.

(10) Patent No.: US 11,156,156 B2
(45) Date of Patent: Oct. 26, 2021

(54) GAS TURBINE ENGINE WITH A UNITARY STRUCTURE AND METHOD FOR MANUFACTURING THE SAME

(71) Applicant: United Technologies Corporation, Farmington, CT (US)

(72) Inventors: Lawrence Binek, Glastonbury, CT (US); Jesse R. Boyer, Middletown, CT (US); Om P. Sharma, South Windsor, CT (US); Evan Butcher, Suffield, CT (US); Bryan G. Dods, Greer, SC (US); Vijay Narayan Jagdale, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 398 days.

(21) Appl. No.: 16/151,728

(22) Filed: Oct. 4, 2018

(65) Prior Publication Data

US 2020/0109663 A1 Apr. 9, 2020

(51) Int. Cl.
*F02C 7/22* (2006.01)
*F02K 3/10* (2006.01)
(Continued)

(52) U.S. Cl.
CPC ............... *F02C 3/05* (2013.01); *F02C 3/145* (2013.01); *F02C 7/222* (2013.01); *F02K 3/10* (2013.01);
(Continued)

(58) Field of Classification Search
CPC .... F01D 5/085; F01D 5/081087; F01D 5/082; F01D 5/084; F02K 3/10; F23R 3/20; F23R 3/18–20; F23R 3/28–36; F02C 7/16; F02C 7/222; F02C 9/26–58; B33Y 80/00; B64C 2201/00; B64C 2201/048; B64C 2201/16; B64C 2201/162; B64C 2201/165; B64C 2201/167; F05D 2260/205; F05D 2230/53; F05D 2240/63
See application file for complete search history.

(56) References Cited

U.S. PATENT DOCUMENTS 2,979,293 A * 4/1961 Mount .................... F02C 7/224
244/117 A
3,377,803 A * 4/1968 Prachar .................. F02C 7/224
60/761

(Continued)

FOREIGN PATENT DOCUMENTS

JP 0719481 1/1995

OTHER PUBLICATIONS

EP search report for EP19201535.2 dated Jan. 9, 2020.

*Primary Examiner* — Gerald L Sung
*Assistant Examiner* — Stephanie Sebasco Cheng
(74) *Attorney, Agent, or Firm* — Getz Balich LLC

(57) ABSTRACT

A gas turbine engine is provided that includes a compressor section, a turbine section, and a unitary structure. The compressor section has at least one compressor rotor stage. The turbine section has at least one turbine rotor stage. The compressor rotor stage and the turbine rotor stage are in rotational communication with each other. The unitary structure includes an outer case portion, a combustor section, a turbine nozzle, and an exhaust duct. The unitary structure configured for attachment with the turbine section and compressor section.

18 Claims, 2 Drawing Sheets

(51) Int. Cl.
  *B33Y 80/00* (2015.01)
  *F23R 3/20* (2006.01)
  *F02C 3/05* (2006.01)
  *F02C 3/14* (2006.01)
  *F23R 3/34* (2006.01)
  *F23R 3/54* (2006.01)

(52) U.S. Cl.
  CPC ........... *B33Y 80/00* (2014.12); *F05D 2240/14* (2013.01); *F05D 2240/35* (2013.01); *F23R 3/20* (2013.01); *F23R 3/346* (2013.01); *F23R 3/54* (2013.01)

(56) References Cited

U.S. PATENT DOCUMENTS

| | | | |
|---|---|---|---|
| 4,825,640 A | 5/1989 | Shekleton | |
| 4,896,501 A | 1/1990 | Faulkner | |
| 5,317,864 A * | 6/1994 | Shorb | F23R 3/28 60/740 |
| 5,341,640 A | 8/1994 | Faulkner | |
| 5,727,378 A | 3/1998 | Seymour | |
| 6,510,684 B2 * | 1/2003 | Matsunaga | F02C 3/05 415/114 |
| 6,895,756 B2 * | 5/2005 | Schmotolocha | F02K 3/10 60/749 |
| 6,931,862 B2 * | 8/2005 | Harris | F23R 3/045 60/732 |
| 7,448,199 B2 * | 11/2008 | Johnson | F01D 15/10 239/265.17 |
| 2002/0012588 A1 | 1/2002 | Matsunaga | |
| 2010/0043440 A1 | 2/2010 | Heilos | |
| 2015/0275762 A1 | 10/2015 | Kenyon | |
| 2017/0159936 A1 | 6/2017 | Cunha | |
| 2018/0112878 A1 | 4/2018 | Pacheco-Tougas | |
| 2019/0368381 A1 * | 12/2019 | Greenwood | F01D 25/246 |

* cited by examiner

GAS TURBINE ENGINE WITH A UNITARY
STRUCTURE AND METHOD FOR
MANUFACTURING THE SAME

BACKGROUND OF THE INVENTION

1. Technical Field

The present disclosure relates generally to gas turbine engines, and more specifically to a small single use gas turbine engine and methods of manufacturing the same.

2. Background Information

Gas turbine engines are well known propulsion systems for aircraft. Gas turbine engines are also often used in land based applications for powering electrical generators and the like. In these type applications, a gas turbine engine is often a relatively complex machine comprising a large number of components that is intended to be used over a long life span having a large number of operational cycles. Hence, the cost associated with manufacturing and maintaining the large number of components is weighed against the life span of the engine and the application for which it is designed.

Gas turbine engines have also been designed as single use propulsion systems, for example, for an unmanned aero vehicle (UAV). In a single use application, the gas turbine engine is used for a very short period of time; e.g., typically less than two hours. Because of the very short life span, these types of gas turbine engines are typically designed with very different durability constraints in comparison to gas turbine engines designed to power aircraft or as industrial gas turbine engines. In UAV type applications, the gas turbine engine is also typically designed to be relatively light weight. Because gas turbine engines used in UAV applications are single use, the cost to manufacture and assemble are important aspects.

What is needed is a gas turbine engine appropriate for a UAV type application that is relatively cost effective in design and in method of manufacturing/assembly.

SUMMARY

According to an aspect of the present disclosure, a gas turbine engine is provided that includes a compressor section, a turbine section, and a unitary structure. The compressor section has at least one compressor rotor stage. The turbine section has at least one turbine rotor stage. The compressor rotor stage and the turbine rotor stage are in rotational communication with each other. The unitary structure includes an outer case portion, a combustor section, a turbine nozzle, and an exhaust duct. The unitary structure configured for attachment with the turbine section and compressor section.

In any of the aspects or embodiments described above and herein, the unitary structure may be additively manufactured.

In any of the aspects or embodiments described above and herein, the unitary structure may consist of a single material.

In any of the aspects or embodiments described above and herein, the unitary structure may include an augmentor disposed within the exhaust duct.

In any of the aspects or embodiments described above and herein, the unitary structure may include a diffuser ring.

In any of the aspects or embodiments described above and herein, the gas turbine engine may include a second outer case portion and an inlet section, wherein the inlet section is disposed forward of the compressor section, and the compressor section and the turbine section are disposed within the second outer case portion and the second outer case portion is selectively attachable to the outer case portion of the unitary structure.

In any of the aspects or embodiments described above and herein, the unitary structure may include an annular passage disposed radially outside of the combustor, between the outer case and the combustor.

In any of the aspects or embodiments described above and herein, the unitary structure may include an augmentor disposed within the exhaust duct.

In any of the aspects or embodiments described above and herein, wherein the engine may include a fuel conduit system configured to collect fuel used as either a lubricant, or a coolant, or both within the gas turbine engine, and supply the aforesaid fuel to the augmentor.

According to another aspect of the present disclosure, a method of assembling a gas turbine engine is provided. The method includes: a) producing a unitary structure that includes an outer case portion, a combustor section, a turbine nozzle, and an exhaust duct; b) providing a compressor section having at least one compressor rotor stage, and a turbine section having at least one turbine rotor stage; c) assembling the turbine section to the unitary structure so that the turbine rotor stage is at least partially received within the turbine nozzle; and d) attaching the compressor rotor stage and the turbine rotor stage in rotational communication with each other.

In any of the aspects or embodiments described above and herein, the method may further include providing a second outer case portion configured to enclose the compressor rotor stage and the turbine stage, and attaching the second outer case portion to the outer case portion of the unitary structure.

According to another aspect of the present disclosure, a method of manufacturing a gas turbine engine is provided that includes: a) producing a unitary structure that includes an outer case portion, a combustor section, a turbine nozzle, and an exhaust duct using an additive manufacturing process; b) producing a subassembly that includes a compressor section having at least one compressor rotor stage coupled with a turbine section having at least one turbine rotor stage, wherein the compressor rotor stage is in rotational communication with the turbine rotor stage; and c) assembling the subassembly to the unitary structure.

In any of the aspects or embodiments described above and herein, the unitary structure may consist of a single material.

In any of the aspects or embodiments described above and herein, the unitary structure may further include an augmentor disposed within the exhaust duct.

In any of the aspects or embodiments described above and herein, the unitary structure may further include a diffuser ring.

In any of the aspects or embodiments described above and herein, the subassembly may further include a second outer case portion configured to enclose the compressor rotor stage and the turbine stage, and the method may further include attaching the second outer case portion to the outer case portion of the unitary structure.

The present disclosure, and all its aspects, embodiments and advantages associated therewith will become more readily apparent in view of the detailed description provided below, including the accompanying drawings.

DETAILED DESCRIPTION

Figure 1:
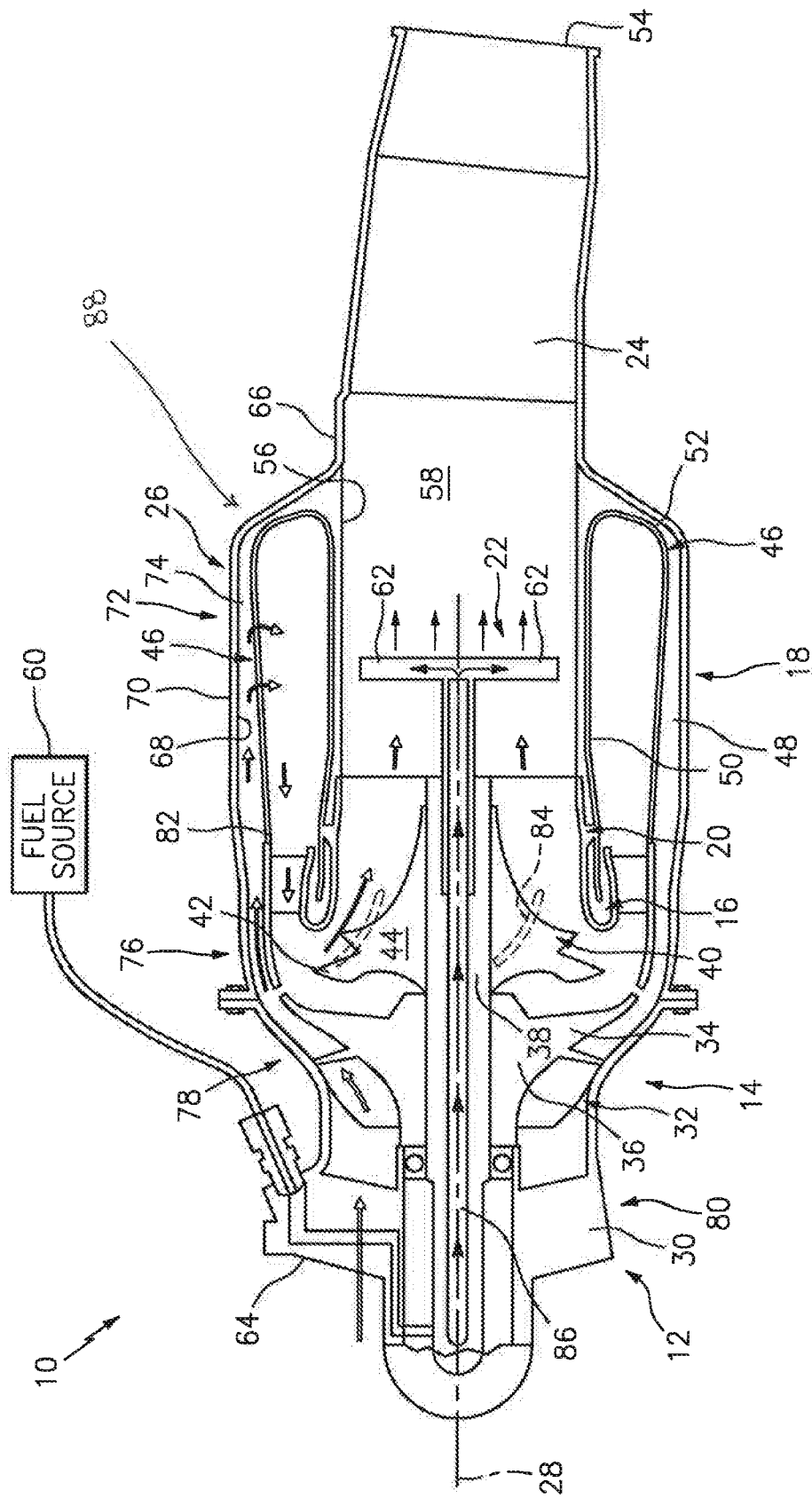
FIG. 1 is diagrammatic cross-sectional view of a gas turbine engine embodiment.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

Referring to FIG. 1, a gas turbine engine 10 is schematically shown. The gas turbine engine 10 includes an inlet section 12, a compressor section 14, a turbine section 16, a combustor section 18, a turbine nozzle 20, an exhaust duct 24, and an outer case 26. In some embodiments, the gas turbine engine 10 according to the present disclosure may include an augmentor 22 and/or a diffuser ring 82. The augmentor 22 may be disposed within the exhaust duct 24. The diffuser ring 82 may be disposed radially outside of and substantially axially aligned with the turbine section 16. Components disposed within the gas turbine engine 10 may be described in terms of "forward" and "aft". For example, the inlet section 12, where air is drawn into the gas turbine engine 10, is disposed at the forward most portion of the engine 10 and the nozzle 54 of the exhaust duct 24, where air (and combustion products) exit the gas turbine engine 10, is disposed at the aft most portion of the engine 10. The gas turbine engine 10 may be described as having an axial centerline 28.

The inlet section 12 is configured as an inlet for air to enter the gas turbine engine 10 and to direct the air inwardly within the engine 10; e.g., to the compressor section 14. In some embodiments, the inlet section 12 may include a plurality of static inlet guide vanes 30 configured to direct the incoming air in a direction favorable for receipt into the compressor section 14. The present disclosure is not limited to any particular inlet section 12 configuration.

The compressor section 14 includes at least one compressor rotor stage 32 that includes a plurality of compressor rotor blades 34 extending out from a compressor rotor hub 36. The compressor rotor blades 34 typically have an airfoil configuration. In some embodiments, the compressor rotor blades 34 and the compressor rotor hub 36 may be a unitary structure (sometimes referred to as an "integrally bladed rotor" or "IBR"). In other embodiments, each compressor rotor blade 34 may be an independent unit that is affixed to the compressor rotor hub 36. The present disclosure is not limited to any particular compressor rotor stage 32 configuration; e.g., geometry, or unitary or assembled configuration. In the exemplary embodiment shown in FIG. 1, there is a single compressor rotor stage 32. In alternative embodiments, the compressor section 14 may include a plurality of rotor stages. As will be explained below, the compressor rotor hub 36 (and therefore the compressor rotor stage 32) is in communication with a rotor shaft 38 that rotationally drives the compressor rotor stage 32. The present disclosure is not limited to any particular compressor section 14 configuration.

The turbine section 16 includes at least one turbine rotor stage 40 that includes a plurality of turbine rotor blades 42 extending out from a turbine rotor hub 44. The turbine rotor blades 42 typically have an airfoil configuration. In some embodiments, the turbine rotor blades 42 and the turbine rotor hub 44 may be a unitary structure (sometimes referred to as an "integrally bladed rotor" or "IBR"). In other embodiments, each turbine rotor blade 42 may be an independent unit that is affixed to the turbine rotor hub 44. The present disclosure is not limited to any particular turbine rotor stage 40 configuration; e.g., geometry, or unitary or assembled configuration. In the exemplary embodiment shown in FIG. 1, there is a single turbine rotor stage 40. In alternative embodiments, the turbine rotor section 16 may include a plurality of turbine rotor stages. As will be explained below, the turbine rotor hub 44 (and therefore the turbine rotor stage 40) is in communication with the rotor shaft 38. The present disclosure is not limited to any particular turbine section 16 configuration.

The turbine nozzle 20 is disposed radially outside of at least a portion of the turbine section 16, extending circumferentially around the at least a portion of the turbine section 16. At least a portion of the turbine nozzle 20 may extend aft of the turbine section 16. The turbine nozzle 20 is configured to direct air (and combustion products) within and out of the turbine section 16 towards the exhaust duct 24 and the augmentor 22 disposed therein in a favorable orientation.

The combustor section 18 includes at least one combustor 46. In the embodiment shown in FIG. 1, the at least one combustor 46 is an annular structure having a radially outer wall 48, a radially inner wall 50, and aft wall 52, and at least one exit orifice disposed at a forward end. The radially outer wall 48 and the radially inner wall 50 are radially spaced apart from one another, and are connected to one another by the aft wall 52. The radially outer and inner walls 48, 50 and the aft wall 52 define an annular interior cavity. The combustor 46 typically includes a plurality of fuel nozzles connected to a fuel source and one or more igniters. The fuel nozzles may be disposed around the circumference of the combustor 46. As will be explained below, the igniters are configured to provide sufficient energy to ignite fuel injected into the combustor 46 through the fuel nozzles. The present disclosure is not limited to the described annular combustor 46 example. Alternatively, the combustor section 18 may include a plurality of independent combustors, circumferentially spaced apart from one another. The present disclosure is not limited to any particular combustor section 18 configuration.

The rotor shaft 38 is engaged with both the turbine rotor hub 44 and the compressor rotor hub 36; e.g., rotating the rotor shaft 38 causes both the turbine rotor hub 44 and the compressor rotor hub 36 to rotate. In some embodiments, the rotor shaft 38 may be engaged with a gear drive (not shown) intermediate between the turbine rotor hub 44 and the compressor rotor hub 36. In these instances, the gear drive may be configured to cause the compressor rotor hub 36 and the turbine rotor hub 44 to rotate at different rotational speeds (e.g., different RPMs). Typically, the rotor shaft 38 is mounted relative to one or more bearings that facilitate rotational movement of the shaft 38 and provide support for the rotor shaft 38. The present disclosure is not limited to any particular rotor shaft 38 configuration and may include a gear drive as described above.

The exhaust duct 24 is configured to provide a gas path for air (and combustion products) between the turbine section 16 and a nozzle portion 54 of the exhaust duct 24. In a UAV, the nozzle portion 54 of the exhaust duct 24 may be disposed in ambient air, or it may be connected to a conduit within the UAV that directs the air away from the gas turbine engine 10 and out of the UAV. The exhaust duct 24 is defined by an enclosing wall 56 (e.g., circumferentially extending) that has an interior surface and an exterior surface. The enclosing wall 56 defines an interior cavity 58 of the exhaust duct 24.

The present disclosure is not limited to any particular exhaust duct 24 configuration.

The augmentor 22 is disposed within the interior cavity 58 of the exhaust duct 24, aft of the turbine nozzle 20. The augmentor 22 is connected to a fuel supply 60 as will be described below. The augmentor 22 is configured to selectively distribute fuel into the exhaust duct 24. In some embodiments, the augmentor 22 may include a plurality of radially extending spray bars 62 circumferentially distributed within the exhaust duct 24.

The outer case 26 includes a forward end 64, an aft end 66, an inner surface 68, and an outer surface 70. The outer case 26 is configured to enclose at least a portion of the gas turbine engine 10. In the exemplary gas turbine embodiment shown in FIG. 1, the aft end 66 of the outer case 26 is in communication with the exhaust duct 24, and the exhaust duct 24 may extend aftward a distance beyond the aft end of the outer case 26. A first portion 72 of the outer case 26 is disposed radially outside of the combustor section 18. The first portion 72 of the outer case 26 is configured to create an annular passage 74 disposed radially outside of the combustor 46; i.e., the annular passage 74 is defined between the inner surface 68 of the outer case 26 and the radially outer wall 48 of the combustor 46. A second portion 76 of the outer case 26 is disposed radially outside of the turbine section 16. The second portion 76 of the outer case 26 is configured to create an annular passage disposed radially outside of the turbine section 16. A third portion 78 of the outer case 26 is disposed radially outside of the compressor section 14. The third portion 78 of the outer case 26 is configured to provide an outer gas path boundary radially outside of the compressor section 14. A fourth portion 80 of the outer case 26 is disposed radially outside of the inlet section 12. The fourth portion 80 of the outer case 26 is configured to define an outer gas path boundary of the inlet compressor section 14.

In some embodiments, the outer case 26 may include at least two sections. The first section may include the first and second portions 72, 76 of the outer case 26, and the second section may include the third and fourth portions 78, 80 of the outer case 26. The first and second sections of the outer case 26 are configured to be attached to one another; e.g., by mechanical fasteners, weldment, etc. The present disclosure is not limited to this particular outer case 26 configuration.

In some embodiments, a gas turbine engine 10 according to the present disclosure may include a diffuser ring 82 disposed radially outside of and substantially axially aligned with the turbine section 16. The diffuser ring 82 includes a plurality of static vanes 84 (shown in phantom) that extend radially inwardly toward the turbine rotor stage 40, and are distributed around the circumference of the turbine rotor stage 40. The static vanes 84 are configured to direct air (and combustion products) traveling through the turbine rotor stage 40; e.g., in directions that assist the performance of the turbine section 16 (e.g., aerodynamic performance). The present disclosure is not limited to any particular diffuser ring 82 configuration.

Figure 2:
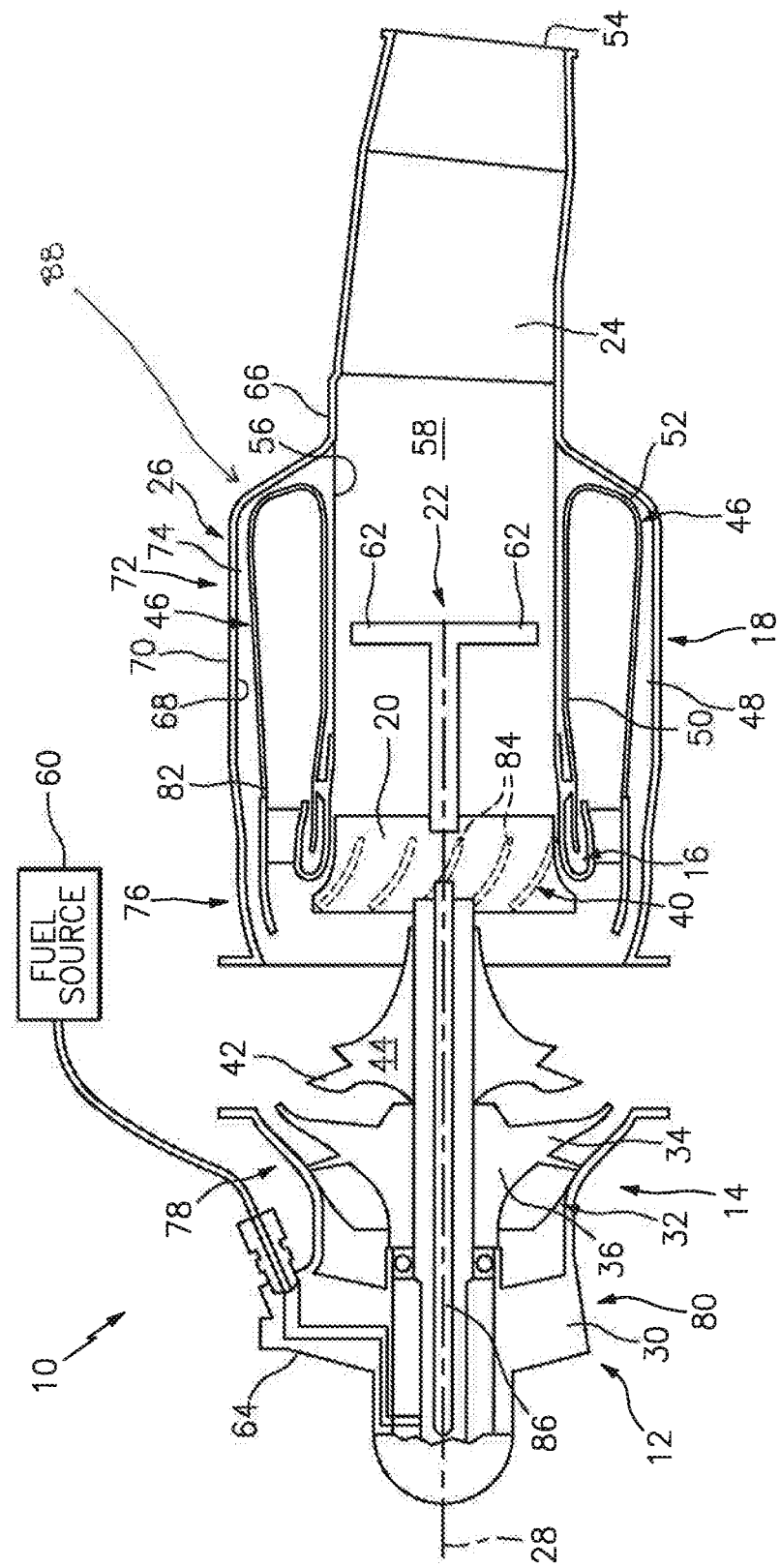
FIG. 2 is a partial exploded view of the gas turbine engine embodiment shown in FIG. 1.

According to an aspect of the present disclosure, portions of the gas turbine engine 10 are configured as a unitary structure 88 (e.g., see FIG. 2). For example, in some embodiments, a portion of the outer case 26 (e.g., the first and second portions 72, 76 of the outer case 26 described above), the combustor 46, the turbine nozzle 20, and the exhaust duct 24, may be manufactured as a unitary structure 88. The term "unitary structure" as used herein refers to a structure that is formed as single structure, as opposed to a plurality of components that independently manufactured and are subsequently fastened to one another (e.g., by mechanical fasteners, weldments, etc., or some combination thereof). In those engine embodiments that include an augmentor 22 and/or a diffuser ring 82, the unitary structure 88 may be formed to include the augmentor 22 and/or the diffuser ring. The aforesaid unitary structure 88 may be formed by an additive manufacturing process. Non-limiting examples of acceptable additive manufacturing technologies that may be used include, direct metal laser sintering (DMLS), electron beam melting (EBM), selective heat sintering (SHS), selective laser melting (SLM), and selective laser sintering (SLS). The present disclosure is not limited to forming the unitary structure 88 via additive manufacturing techniques, and in those instances wherein an additive manufacturing technique is used, the present disclosure is not limited to any particular additive manufacturing technique. The additively manufactured unitary structure may consist of a single material (e.g., a metal alloy) formed during the additive manufacturing process.

In those embodiments wherein a portion of the gas turbine engine 10 is configured as a unitary structure 88 (e.g., a static structure, see FIG. 2), the rotary portions of the gas turbine engine 10 may be assembled with the unitary structure 88 to form the engine. For example, the compressor section 14 and the turbine section 16 may be assembled together as a subassembly (e.g., see FIG. 2), and joined with the unitary structure; e.g., the assembled compressor and turbine sections 14, 16 can be slid into the forward end of the unitary structure 88, with the turbine rotor stage 40 being received within the turbine nozzle 20 and appropriately secured. In some embodiments, the second section of the outer case 26 (e.g., the third and fourth portions 78, 80 of the outer case 26 described above) and the inlet section 12 may be assembled as a unit and subsequently joined with remainder of the gas turbine engine 10 (i.e., the unitary structure 88 and combined compressor and turbine sections 14, 16). In alternative embodiments, the compressor section 14 and the turbine section 16 may be assembled with the second section of the outer case 26 (e.g., the third and fourth portions 78, 80 of the outer case 26 described above) and the inlet case into a single subassembly (e.g., shown as subassembly 90 in FIG. 2), which assembly may subsequently be joined with the unitary structure 88 to form the gas turbine engine 10. The present disclosure is not limited to any particular sequence of assembly; e.g., the turbine section 16 may be assembled with the unitary structure 88, and the compressor section 14 subsequently assembled with the turbine section 16/unitary structure 88, etc.

Referring to FIG. 1, when assembled, the gas turbine engine 10 may be described as having a core gas path wherein air entering the engine through the inlet is compressed, mixed with fuel, combusted, passed through the turbine, and subsequently exited the engine via the exhaust nozzle 54. The air and combustion products produced by the fuel/air ignition within the combustor 46 (and in some instances some non-combusted fuel—all collectively referred to as "core gas") exits the combustor 46 with a dramatic increase in energy. The energized core gas subsequently enters the turbine section 16, driving the turbine stage 40. The turbine stage 40, in turn, drives the compressor rotor stage 32 via the rotor shaft 38 that is in communication there between. Although a portion of the energy possessed by the energized core gas is removed by work done on the turbine stage 40, the energized core gas (which still possesses significant energy) passes into and out of the exhaust duct 24, producing motive force in the form of thrust. FIG. 1 diagrammatically illustrates the above described core gas path via arrows.

In those embodiments wherein the unitary structure includes an augmentor 22 (e.g., disposed within the exhaust duct 24), the gas turbine engine 10 may include a system wherein fuel is fed into the engine upstream of the compressor section 14 (e.g., in the inlet section 12), which fuel is used as either a lubricant, or a coolant, or both. This fuel is independent of the fuel that is provided into the combustor section 18, and does not enter the core gas path prior to the exit of the turbine stage 40. In those embodiments wherein the unitary structure includes an augmentor 22, the gas turbine engine 10 may include a fuel conduit system that collects the fuel earlier used as a lubricant, or a coolant, or both. The collected fuel is passed via the fuel conduit system 86 into the augmentor 22. As stated above, the augmentor 22 is configured to selectively distribute fuel into the exhaust duct 24. The fuel distributed into the exhaust duct 24 mixes with the core gas passing within the exhaust duct 24 to create a combustible mixture. In some embodiments, the fuel earlier used as a lubricant, or a coolant, or both, is elevated to a temperature (e.g., elevated in temperature during its use as a lubricant, a coolant, or both, and may be further elevated in temperature upon mixing with the core gas within the exhaust duct 24) wherein the fuel is at a flash point and combustion is accomplished without an ignition source. In some embodiments, the augmentor 22 may include an ignition source to initiate combustion, and/or to ensure adequate combustion. The combustion of the fuel distributed via the augmentor 22 further elevates the energy possessed by the core gas within the exhaust duct 24 and consequently elevates the thrust produced by the gas turbine engine 10.

As can be discerned from the description above, there are substantial, novel, and unobvious benefits associated with a gas turbine engine 10 that includes a unitary structure 88 as described above. For example, creating a unitary structure 88 (e.g., including a portion of the outer case 26, the combustor 46, the turbine nozzle 20, and the exhaust duct 24, and in some embodiments an augmentor 22 and/or a diffuser ring 82) as described above significantly decreases the number of components within the gas turbine engine 10 and consequently the time and cost to manufacture and assemble. As another example, creating the unitary structure via an additive manufacturing process may permit complex component geometries that are not otherwise capable of manufacture and/or assembly.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalents.

What is claimed is:

1. A gas turbine engine, comprising:
a compressor section having at least one compressor rotor stage;
a turbine section having at least one turbine rotor stage, wherein the compressor rotor stage and the turbine rotor stage are in rotational communication with each other via a shaft;
a unitary structure that includes an outer case portion, a combustor section, a turbine nozzle, an exhaust duct, and an augmentor within the exhaust duct, the unitary structure configured for attachment with the turbine section and the compressor section; and
a fuel conduit system comprising a fuel conduit located radially within the shaft with respect to an axial centerline of the gas turbine engine and configured to collect fuel used as either a lubricant, or a coolant, or both within the gas turbine engine, and supply the aforesaid fuel to the augmentor;
wherein the fuel conduit extends along and is centered about the axial centerline from a first axial end of the fuel conduit located axially upstream of the compressor section to a second axial end of the fuel conduit located within the augmentor; and
wherein the augmentor includes an axially extending portion which is coaxial with the fuel conduit and configured to receive the fuel conduit in a direction along the axial centerline and wherein at least a portion of the axially extending portion is located axially and radially within the shaft.

2. The gas turbine engine of claim 1, wherein the unitary structure is additively manufactured.

3. The gas turbine engine of claim 2, wherein the unitary structure consists of a single material.

4. The gas turbine engine of claim 1, wherein the unitary structure further comprises a diffuser ring.

5. The gas turbine engine of claim 1, further comprising a second outer case portion and an inlet section, wherein the inlet section is disposed forward of the compressor section, and the compressor section and the turbine section are disposed within the second outer case portion and the second outer case portion is selectively attachable to the outer case portion of the unitary structure.

6. The gas turbine engine of claim 5, wherein the unitary structure includes an annular passage disposed radially outside of a combustor of the combustor section, between the outer case and the combustor.

7. The gas turbine engine of claim 1, wherein the fuel conduit system is configured to supply the fuel to the augmentor and the fuel is independent of a second fuel that is provided into the combustor section.

8. The gas turbine engine of claim 7, further comprising a fuel supply connected to the augmentor via the fuel conduit system, the fuel supply configured to provide the fuel axially upstream of the compressor section for use as either the lubricant, or the coolant, or both.

9. The gas turbine engine of claim 1, wherein the augmentor further includes a plurality of radially extending spray bars axially downstream of the axially extending portion.

10. A method of assembling a gas turbine engine, comprising:
producing a unitary structure that includes an outer case portion, a combustor section, a turbine nozzle, an exhaust duct, and an augmentor within the exhaust duct;
providing a compressor section having at least one compressor rotor stage, and a turbine section having at least one turbine rotor stage;
connecting a fuel conduit of a fuel conduit system to the augmentor, the fuel conduit configured to collect fuel used as either a lubricant, or a coolant, or both within the gas turbine engine, and supply the aforesaid fuel to the augmentor;

assembling the turbine section to the unitary structure; and assembling the compressor rotor stage in rotational communication with the turbine rotor stage via a shaft;

wherein, subsequent to connecting the fuel conduit to the augmentor, the fuel conduit extends along and is centered about an axial centerline of the gas turbine engine from a first axial end of the fuel conduit located axially upstream of the compressor section to a second axial end of the fuel conduit located within the augmentor, the augmentor includes an axially extending portion which is coaxial with the fuel conduit, and at least a portion of the axially extending portion is located axially and radially within the shaft.

11. The method of claim 10, wherein the unitary structure is additively manufactured.

12. The method of claim 11, wherein the unitary structure consists of a single material.

13. The method of claim 10, wherein the unitary structure further comprises a diffuser ring.

14. The method of claim 10, further comprising providing a second outer case portion configured to enclose the compressor rotor stage and the turbine stage; and attaching the second outer case portion to the outer case portion of the unitary structure.

15. A method of manufacturing a gas turbine engine, comprising:

producing a unitary structure that includes an outer case portion, a combustor section, a turbine nozzle, an exhaust duct, and an augmentor within the exhaust duct using an additive manufacturing process;

producing a subassembly that includes a compressor section having at least one compressor rotor stage coupled with a turbine section having at least one turbine rotor stage, wherein the compressor rotor stage is in rotational communication with the turbine rotor stage via a shaft;

assembling the subassembly to the unitary structure;

wherein assembling the subassembly to the unitary structure includes sliding the subassembly into a forward end of the unitary structure so as to connect a fuel conduit of a fuel conduit system to the augmentor, the fuel conduit configured to collect fuel used as either a lubricant, or a coolant, or both within the gas turbine engine, and supply the aforesaid fuel to the augmentor; and wherein, subsequent to assembling the subassembly to the unitary structure, the fuel conduit is located radially within the shaft and extends along and is centered about an axial centerline of the gas turbine engine from a first axial end located axially upstream of the compressor section to a second axial end located axially downstream of the turbine section, the augmentor includes an axially extending portion which is coaxial with the fuel conduit, and at least a portion of the axially extending portion is located axially and radially within the shaft.

16. The method of claim 15, wherein the unitary structure consists of a single material.

17. The method of claim 15, wherein the unitary structure further comprises a diffuser ring.

18. The method of claim 15, wherein the subassembly further includes a second outer case portion configured to enclose the compressor rotor stage and the turbine stage; and the method further comprises:

attaching the second outer case portion to the outer case portion of the unitary structure.

\* \* \* \* \*